United States Patent [19]

Stewart, Jr.

[11] 3,721,969

[45] March 20, 1973

[54] DATA COMMINICATING SYSTEM HAVING MEANS FOR SENSING DIFFERENCE BETWEEN REFERENCE AND DATA SIGNALS

[75] Inventor: Victor E. Stewart, Jr., South Milwaukee, Wis.

[73] Assignee: McGraw-Edison Company, South Milwaukee, Wis.

[22] Filed: Feb. 22, 1971

[21] Appl. No.: 117,293

[52] U.S. Cl. ..................340/207, 324/79 D, 225/419, 340/151, 340/204, 340/345, 340/351

[51] Int. Cl. ..............................................G08c 19/16

[58] Field of Search......340/207 R, 171 R; 324/79 R, 324/79 D; 328/134, 141; 325/419, 420, 421; 179/15 BS

[56] References Cited

UNITED STATES PATENTS 3,059,187 10/1962 Jaffe ....................................324/79 R 3,163,823 12/1964 Kellis et al. ..........................324/79 R 3,403,338 9/1968 Martin.................................324/79 D 3,427,442 2/1969 Sklaroff...............................324/79 R 3,514,698 5/1970 Rey .....................................328/134

*Primary Examiner*—Thomas B. Habecker
*Assistant Examiner*—Robert J. Mooney
*Attorney*—R. J. Falkowski

[57] ABSTRACT

A data gathering system, particularly adapted for communicating of meter reading data over telephone lines, comprising data reading means, encoding means and coded data transmitting transponder means located at a remote location such as a subscriber's home; and centrally located control means, transponder exciting means, decoding means, and utilization means. The system has a data transmission scheme using an extended baud, multilevel frequency signal system wherein values are represented by frequency differences relative to a reference frequency and the decoding apparatus adjusts in response to the reference frequency signal to compensate for transponder variations or long term drift.

8 Claims, 15 Drawing Figures

INVENTOR
VICTOR E. STEWART, JR.
BY
R J Falkowski
ATTORNEY

INVENTOR
VICTOR E. STEWART, JR.
BY
R J Fairbanks
ATTORNEY

FIG. 3
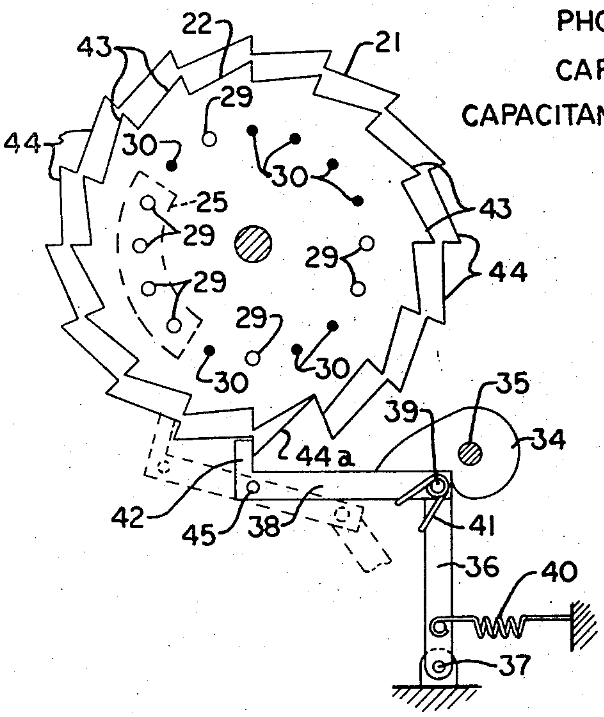
FIG. 6
| PHOTOCELL | 53 | 52 | 51 | 50 | TOTAL CAPACITANCE nf |
|---|---|---|---|---|---|
| CAPACITOR | C4 | C3 | C2 | C1 | |
| CAPACITANCE nf | 8 | 4 | 2 | 1 | |
| POS. | BINARY CODE | | | | |
| 1 | O | O | O | O | 15 |
| 2 | O | O | O | o | 14 |
| 3 | O | O | o | O | 13 |
| 4 | O | o | O | o | 10 |
| 5 | o | O | o | o | 4 |
| 6 | O | o | o | o | 8 |
| 7 | o | o | o | o | 0 |
| 8 | o | o | o | O | 1 |
| 9 | o | o | O | O | 3 |
| 10 | o | O | O | o | 6 |
| 11 | O | O | o | o | 12 |
| 12 | O | o | o | O | 9 |
| 13 | o | o | O | o | 2 |
| 14 | o | O | o | O | 5 |
| 15 | O | o | O | O | 11 |
| 16 | o | O | O | O | 7 |
FIG. 4
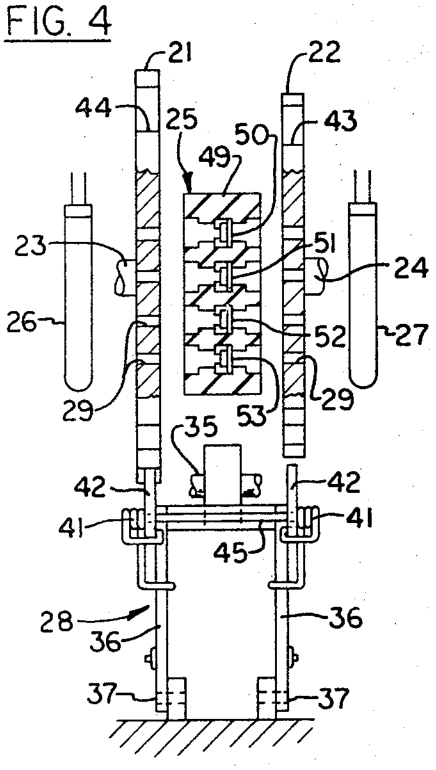
FIG. 5
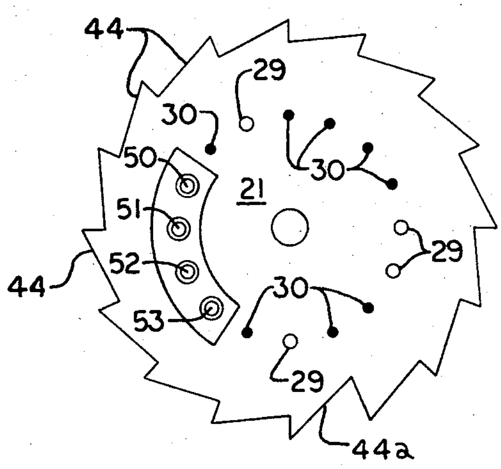
INVENTOR
VICTOR E. STEWART, JR
BY
R J Falkowski
ATTORNEY INVENTOR
VICTOR E. STEWART, JR.
BY
R J Falkowski
ATTORNEY INVENTOR
VICTOR E. STEWART, JR
BY
R J Falkowski
ATTORNEY INVENTOR
VICTOR E. STEWART, JR.
BY
R. J. Falkowski
ATTORNEY INVENTOR
VICTOR E. STEWART, JR.
BY
R J Falkowski
ATTORNEY INVENTOR
VICTOR E. STEWART, JR.
BY
R J Fuchowski
ATTORNEY INVENTOR
VICTOR E. STEWART, JR.
BY
R J Zaikowski
ATTORNEY

DATA COMMINICATING SYSTEM HAVING MEANS FOR SENSING DIFFERENCE BETWEEN REFERENCE AND DATA SIGNALS

BACKGROUND OF THE INVENTION

This invention relates to a data gathering system and, more particularly, to a system for taking data readings at a remote location and communicating the data to a central location. The invention has particular, but not exclusive, application to systems for the automatic remote reading of utility meters from a central station and numerically controlled machinery. Utility meters, such as electric, gas and water meters, are generally widely distributed at the customer's points of usage.

It is the present practice in the reading of such meters for a meter reader to visit each customer's site and to observe and record the registration on each unit. While there have been a large number of proposals for the automatic reading of such meters from a remote location, they have not been commercially adapted because of their high cost and because they could not meet the limitations imposed by existing utility meters and communication systems. Such limitations include expense and the relatively confined space available for encoding devices and utility metering equipment presently installed. If such an automated meter reading system is to be used in a telephone system, the apparatus must, of course, be compatible with the equipment and operation of the telephone system.

SUMMARY OF THE INVENTION

It is, therefore, an object of the invention to provide an economical and low cost data gathering system for the collection of data read by a plurality of reading means.

Another object of the invention is to provide a system of the aforedescribed type which is compatible with utility meter reading apparatus and telephone communication systems.

In any communications system it is generally desirable to have maximum channel capacity. In prior art systems a primary concern was to send the maximum number of information bits in the least possible time. This led to the common use of binary systems in which the pulse width was minimized. With a given band width, those skilled in the art will realize that the signal-to-noise ration must consequently be increased to maintain channel capacity. An increase signal-to-noise ration generally requires more sophisticated and expensive equipment.

In the present invention, low cost of the communicating system is a primary concern, and it was realized that maximum information per unit time was of secondary importance. The present system attacks the problem by including a multiplicity of information bits per baud and by increasing the baud length. The preferred embodiment uses a multiple level frequency signal system to include the multiplicity of bits per baud.

The increase in baud length results in an ability to operate at lower signal-to-noise rations with consequent reduction in equipment cost. The extended baud permits a longer time in which the signal may be processed which, in turn, makes the sensitivity and speed of the equipment less critical. In order to increase the information capacity of the channel with the extended baud, the present system puts several bits into each baud. This is accomplished by using an extended baud frequency signal in which the signal may have 16 discrete frequency levels to permit four bits per baud using binary codes. The longer time available to process the signal makes it possible to accurately discriminate between 16 frequency levels in a practical band width.

In the present system, even though the signal receiving and processing equipment is somewhat sophisticated, the overall system cost is reduced by greatly reducing the cost of the data transmitting equipment. Because of the large number of transmitters in comparison to the required number of centrally located receivers, the saving in transmitter cost greatly outweighs the cost of the receiving and processing equipment as a factor in the overall system cost.

The requirements on the equipment are further reduced by utilizing a relative frequency differential scheme rather than an absolute frequency differential scheme. The basis of the present scheme may be expressed by the following equation:

$$(W_i - W_o/W_o) = F(n)$$

where $n$ = digital value $W_i$ = frequency of data signal $W_o$ = reference frequency The value to be transmitted, therefore, is proportional to the frequency difference from the reference frequency divided by the reference frequency.

In order to reduce the system's dependence on the long term stability of the necessarily low cost oscillator and transponder equipment, the reference frequency is transmitted first and the receiving equipment adjusts itself to the reference frequency before the data signals are transmitted. A memory device stores the reference data for use during decoding of the later transmitted data signals. In this way the system compensates for differences between various transponders as well as differences occuring within any given transponder with time.

Although the present system utilizes multi-level frequency signals to accomplish several bits per baud, the multi-level variation of other signal parameters may be used to accomplish the same ultimate purpose. Other parameters which can be varied instead of frequency are phase difference, amplitude and pulse position. The relative difference scheme herebefore described may also be applied to these other parameters. The system hereinafter described utilizes two registers as the meter location, primary register such as a meter register of the usual sort and secondary register such as an encoder register. At the ultimate usage point, such as an automatic billing system, the previously obtained primary register reading is stored in memory means. The present system transmits the change in secondary register reading to the ultimate usage point where this change is added to the previous primary register reading to obtain a new primary register reading.

BRIEF DESCRIPTION OF THE DRAWINGS

FIG. 3 is an elevation view of certain mechanical elements used with the device illustrated in FIG. 2;

FIG. 4 is a side view of the mechanism illustrated in FIG. 3;

FIG. 5 illustrates one of the elements of the mechanism illustrated in FIG. 3;

FIG. 6 is a table showing the coding system used in the device illustrated in FIGS. 2, 3, 4 and 5;

DESCRIPTION OF THE PREFERRED EMBODIMENT

Figure 1:
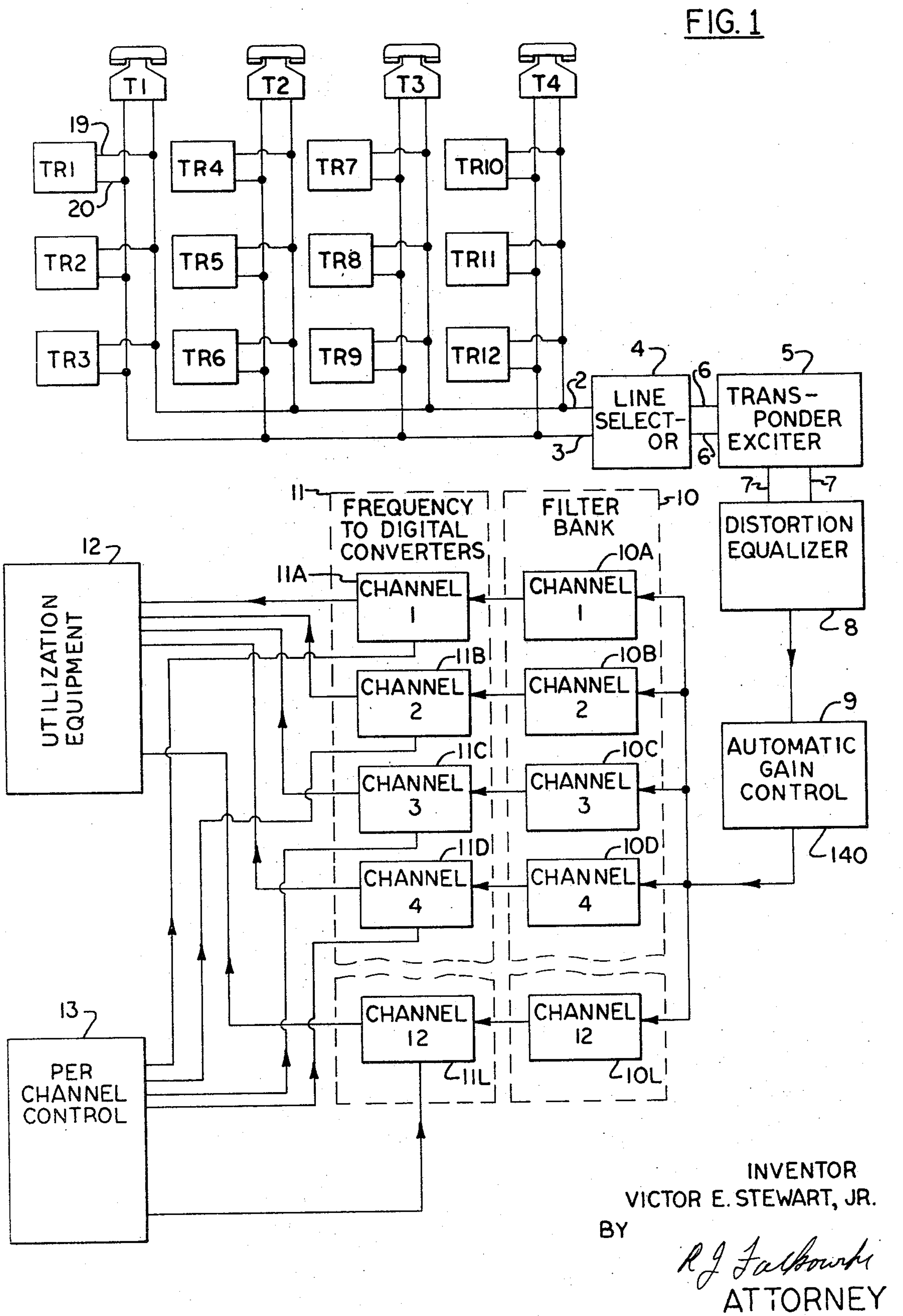
FIG. 1 is a diagrammatic illustration of the overall system embodying the present invention.

Referring to FIG. 1, the data communicating system is shown connected to a single pair of telephone lines 2 and 3. The system may, of course, be connected to any desired set of telephone lines within a telephone system by means of line selecting switching apparatus 4 located at a telephone central exchange. As preferably illustrated, four subscribers' telephones T1, T2, T3 and T4 are connected to telephone lines 2 and 3. It may be desired to read three different utility meters at each subscriber's home or building location, such as a gas meter, water meter and electric meter. A signal transponder is furnished for each meter at each location and, therefore, twelve transponders TR1 through TR12 are illustrated to be connected to telephone lines 2 and 3.

Figure 7:
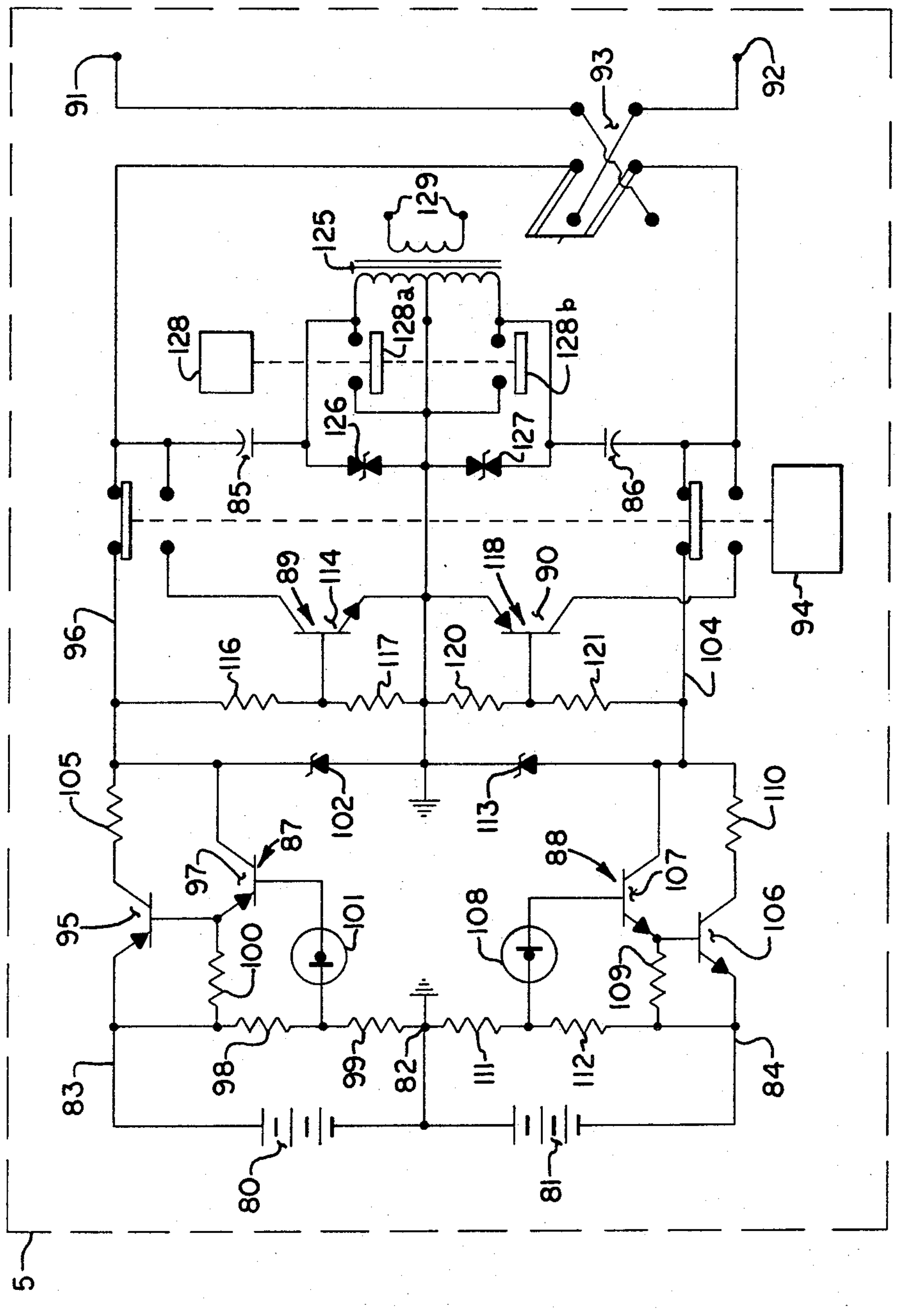
FIG. 7 is a schematic diagram of one of the elements of the system shown in FIG. 1.

A transponder exciting device 5 is shown connected to lines 6 which may be connected to lines 2 and 3, respectively, through line selector 4. The preferred circuitry of transponder exciter 5 is illustrated in FIG. 7. The operation of transponder exciter 5 is more completely described in the copending application Ser. No. 711,705, filed Mar. 8, 1968, and assigned to the present assignee.

Lines 7 carry coded signals picked up in transponder 5 to a distortion equalizer 8 which is preferably of the type described in the article, "An Automatic Equalizer for General Purpose Communication Channels" by R. W. Lucky and H. R. Rudin at page 2179 of *The Bell System Technical Journal*, Vol. XLVI, Nov. 1967. The output of distortion equalizer 8 goes to an automatic gain control 9 which may be of the type more fully illustrated in FIG. 9.

The output of automatic gain control 9 leads to a bank 10 of band-pass filters. The signal is led to each of twelve individual filters 10A through 10L. Each of these filters 10A through 10L may be of a type known as a "TOROTEL" 17540 band pass filter. Filters 10A through 10L separate the signal from automatic gain control 9 into frequency channels 1 through 12 which correspond respectively to the signal frequency bands emanating from transponders TR1 through TR12. The outputs of filters 10A through 10L go to the inputs of corresponding frequency-to-digital converters 11A through 11L, respectively. The outputs of converters 11A through 11L go to appropriate utilization equipment 12.

A per channel control 13 is furnished to control the operation of frequency-to-digital converters 11A through 11L.

Figures 2, 9:
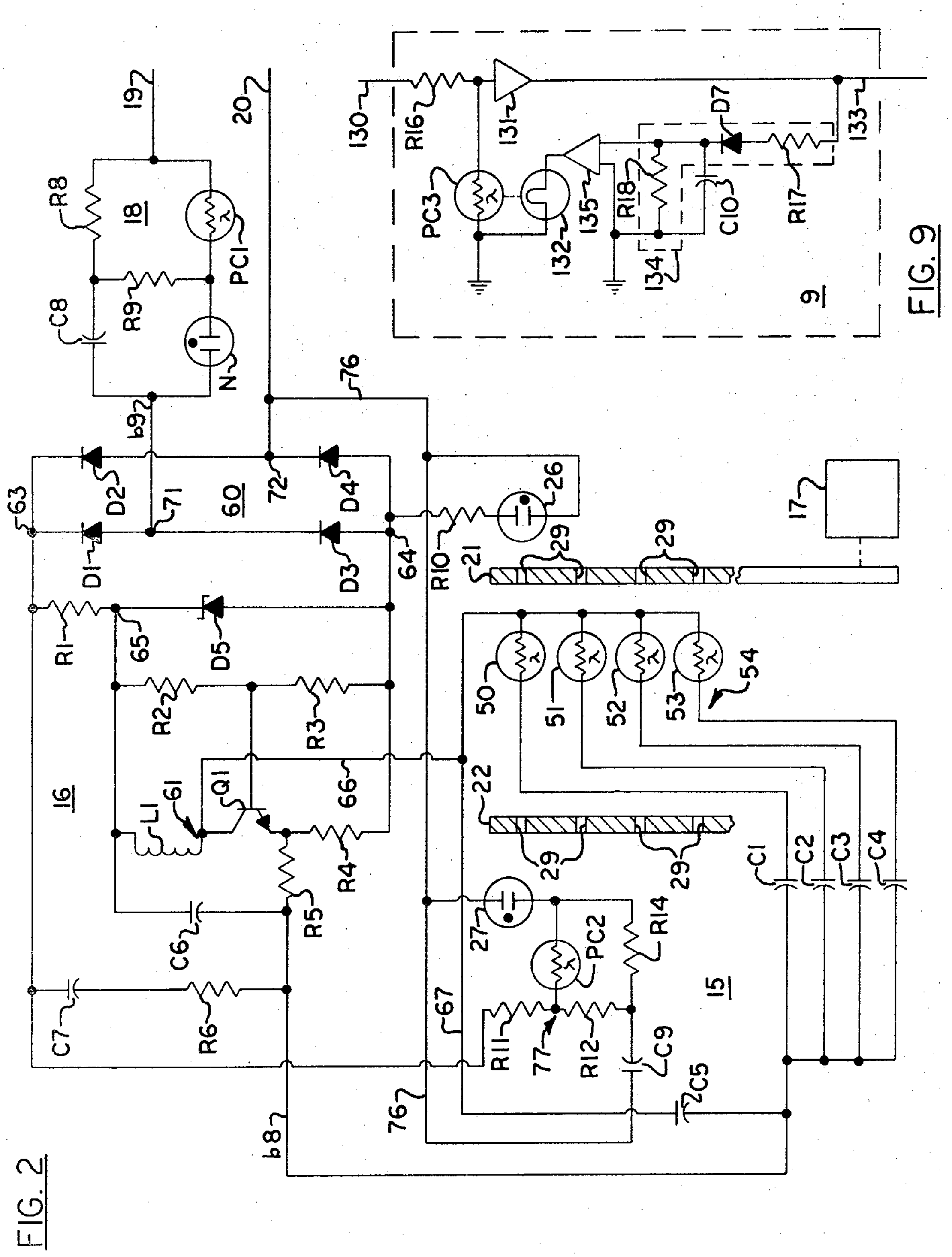
FIG. 2 is a schematic diagram of one of the elements of the system shown in FIG. 1.
FIG. 9 is a schematic diagram of the automatic gain control shown as a block in FIG. 1.

FIG. 2 shows the detailed circuitry of a transponder and meter reading device. The device shown in FIG. 2 is representative of each of the transponders TR1 through TR12 shown in FIG. 1 which, to the extent illustrated herein, may all be identical. The meter reading device shown in FIG. 2 consists of an encoder 15 and a transponder circuit 16. The encoder 15 is mechanically coupled to a meter 17 which is to be read and to the customers' telephone lines 2 and 3 through the transponder circuit 16, a line coupler 18 and a pair of conductors 19 and 20. It can be seen with reference to FIG. 1 that the transponder TR1, for instance, is connected across lines 2 and 3 in shunt of the customer's telephone T1.

The details of meter 17 form no part of the instant invention and, accordingly, will not be discussed in detail. Similarly, line selector 4 is a conventional device, and the details of its construction form no part of the instant invention.

The detailed construction and operation of the remote transponder exciter 5 will appear later in this description. For the present, it is sufficient for a general understanding of the overall system to note that, when it is desired to read meter 17, the line selector 4 at the telephone exchange is operated to connect the remote transponder exciter 5 to the desired telephone lines 2 and 3. The remote transponder exciter 5 then sends a signal through lines 2 and 3 to actuate the line coupler circuit 18, whereby the encoder 15 and the transponder circuit 16 are actuated and coupled to the lines 2 and 3. The encoder 15 provides the coded information relative to the registration of meter 17 to the transponder circuit 16 which, in turn, transmits the information through lines 2 and 3 to the transponder exciter 5, wherein the coded signal is picked up and transmitted through lines 7 to the distortion equalizer 8. It should be noted that lines 7 may in actual practice comprise central office to central office connections over a wide geographic distance. The converting and processing equipment may be at a subscriber's location. It may be seen, therefore, that the present system is to facilitate what is described in the telephony art as end-to-end signalling.

The transponder circuit 3 takes the form of an oscillator, and the encoder may change the parameters of the oscillating circuit as a function of the meter registration, whereby different tone signals will be placed on the lines 2 and 3 in accordance with the reading of meter 17.

FIGS. 3 and 4 show the preferred embodiment of the encoding device 15 in greater detail to include a pair of coded discs 21 and 22 which are respectively mounted for rotation about central shafts 23 and 24, a sensor assembly 25, a pair of neon lamps 26 and 27, and a drive assembly 28 for coupling discs 21 and 22 to the meter being read.

The discs 21 and 22 are provided with an array of coding units, one coding unit being provided for each disc position. In the illustrated embodiment, wherein each of the discs 21 and 22 has 16 positions, 16 coding units are provided on each disc. Also, where the sensor assembly 25 is photosensitive, the coding units comprise holes or transparent positions 29 and unperforated opaque positions 30.

As seen in FIG. 3, the coding units 29 and 30 are arranged on the disc 22 in the substantially equally spaced circular array. A similar array of units 29 and 30 are arranged on disc 21 as shown in FIG. 5. As will be pointed out more fully hereinafter, the arrangement of holes 29 and opaque positions 30 is such that, when used with a least a four-unit sensor assembly 25, an unambiguous code will be provided for each of the sixteen positions of the discs 21 and 22.

In addition, the outer periphery of each of the discs 21 and 22 is coupled to drive assembly 28 which is operative to successively step the disc 21 through each of its sixteen positions and then to advance the disc 22 one position for each revolution of the disc 21. One example of a drive mechanism capable of performing these functions is described in U.S. Pat. No. 3,491,244, Victor E. Stewart Jr., issued Jan. 20, 1970.

The drive assembly 28 includes a scroll cam member 34 which is fixed to a shaft 35 coupled to meter 17. The cam 34 cooperatively engages a pawl assembly for stepping the discs 21 and 22 which comprises a first pair of parallel links 36 having one end pinned at a fixed pivot point 37 and a second pair of links 38 pivotally coupled to the other end of the links 36 by a knee pin 39. A spring 40 holds pin 39 in a resilient engagement with the cam 34, and springs 41 urge clockwise rotation of links 38 to urge fingers 42 at the free ends of links 38 into engagement with the teeth 43 and 44, formed respectively on discs 22 and 21.

The diameter of disc 21 is sufficiently greater than that of disc 22 so that the radially outward extremity of teeth 43 does not extend to the innermost indentation of teeth 44. As a result, one of the fingers 42 will engage the teeth 44 on disc 21, but the other finger 42 will normally be held out of engagement with the teeth 43 of disc 22 by a pin 45 which couples the ends of links 38. However, one tooth *44a* of the teeth on disc 21 extends further into disc 21 than the remaining teeth 44 so that teeth 43 on disc 22 will extend past the inner extremity of tooth *44a*.

As those skilled in the art will appreciate, the cam member 34 may be coupled to the meter 17 by a gear drive (not shown) in such a manner that the cam member 34 will make one revolution for each of a predetermined number of revolutions of meter 17. As the cam member 34 rotates clockwise, as seen in FIG. 3, the links 36 and 38 are moved from their full to their phantom positions, wherein one of the fingers 42 will move into engagement with the succeeding one of teeth 44 on disc 21. As the cam member 34 completes one revolution, wherein its flat portion 47 is moved into engagement with pin 39, the spring 40 will return links 36 and 38 to their full positions, thereby moving the disc 21 one position in the counterclockwise direction. The disc 22 will remain stationary, however, because the other finger 42 will be held out of engagement with teeth 43 by the larger outer periphery of the disc 21 and pin 45.

After the disc 21 has completed one revolution wherein the tooth *44a* is in a position to be engaged by the associated one of fingers 42, the greater depth of tooth 44a will allow engagement between the other finger 42 and one of the teeth 43 on the rim of disc 22. In this manner, the disc 22 will be moved one position for each complete revolution of disc 21.

As seen in FIGS. 3 and 4, the sensor assembly 25 comprises an opaque head 49 which is disposed between the discs 21 and 22 and in close parallelism thereto. When 16-position discs are provided, the sensor assembly 25 includes at least four sensor units or information bit means 50, 51, 52 and 53, which are spaced along the arcuate head 49 at the same distance as that between the coding units 29 and 30. The details of the sensor units 50 through 53 form no part of the present invention and, accordingly, will not be discussed in detail. It is sufficient for the purpose of understanding the instant invention to note that each may comprise a photoresistive element which normally has a relatively high impedance and which changes to a low impedance state upon being illuminated. For a more complete description of sensor units 50 through 53 which may be implied in the instant invention, reference is again made to U.S. Pat. No. 3,491,244, Victor E. Stewart, Jr.

Sensor units 50 through 53 are arranged so that, for each position of the discs 21 and 22, one of the sensor units will face one of the coding units 29 or 30 in each of the discs 21 and 22. Lamps 26 and 27 are disposed adjacent the outer surfaces of each of the discs 21 and 22, respectively, and in an opposed relation to the sensor assembly 25. As will be pointed out more fully hereinafter, the lamps 26 and 27 are connected to be sequentially energized so that the sensor units 50 through 53 will be selectively energized through the holes 29 in the disc 21 by a light emitted from the lamp 26 and then from the opposite side through holes 29 in the disc 22 by a light emitted from lamp 27. The position code for the disc 21 will be determined by which ones of the sensor units 50 through 53 are energized when lamp 26 is lit and, similarly the position code for the disc 22 will be determined by which ones of these sensor units 50 through 53 are illuminated when lamp 27 is lit. It will be understood that only the sensor units 50 through 53 which are opposite a hole 29 in the appropriate one of the discs 21 or 22 will be illuminated, while those adjacent an opaque position 30 will remain unenergized.

If the position of the discs 21 and 22, as shown in FIGS. 3 and 4, is taken as the first position, each of the photosensitive units 50 through 53 will be illuminated when the lamps 26 and 27 are lit. As the discs 21 and 22 are stepped through each of their 16 positions, a different arrangement of photosensitive units 50 through 53 will be illuminated to provide the 16-position unambiguous code shown in FIG. 6.

Reference is again made to FIG. 2 which illustrates how the sensor units 50 through 53 are coupled to the oscillator circuit 16. Specifically, the sensor units 50, 51, 52 and 53 are respectively connected in series with capacitors C1, C2, C3 and C4, and the series combinations formed thereby are connected in parallel with each other and with capacitor C5. As will become more apparent hereinafter, the sensor units 50 through 53 and the capacitors C1 through C4 comprise a capacitive incrementing circuit 54 with respect to capacitor C5.

The transponder 16 includes a diode bridge 60 and an oscillating circuit 61. The diode bridge 60 consists of diodes D1, D2, D3 and D4 which are connected between the oscillating circuit 51 and the encoder 15, on the one hand, and the coupling circuit 18 on the other. When the coupling circuit 18 is active, a D. C. voltage will be supplied to the output terminals 63 and 64 of the diode bridge 60. A Zener diode D5 and a resistor R1 are connected in series across the terminals 63 and 64 for providing a low impedance voltage source constant voltage at a conductor 65 and to the oscillator 61.

Oscillator 61 includes an amplifier comprising a transistor Q1 and a first pair of resistors R2 and R3 which are connected in series across Zener diode D5 and their junction connected to the base of transistor Q1. A third resistor R4 is connected between the emitter of transistor Q1 and terminal 64. Oscillator 61 also includes a Colpitts feedback circuit consisting of an inductance L1 connected between the collector of transistor Q1 and the other terminal of resistor R2, and a first capacitor C6 connected between the other terminal of inductor L1 and by a resistor R5 to the emitter of transistor Q1. Capacitor C5 constitutes a second capacitance in the Colpitts feedback circuit and is connected by conductors 66, 67 and 68 and resistor R5 between the emitter and collector of transistor Q1.

The transponder 16 also includes a resistor R6 and a capacitor C7 which are connected in series between the terminal 63 and resistor R5. Capacitor C7 functions to decouple the emitter of transistor Q1 from terminal 63, and resistor R6 desensitizes the oscillator output frequency to changes in the impedance of the telephone lines 2 and 3.

The coupling circuit 18 includes a photocell PC1 and a neon lamp N which are connected in series with each other by conductors 19 and 69 between one of he telephone lines 6 and one input terminal 71 of diode bridge 60. The coupling circuit 18 also includes a resistor R8 and a capacitor C8 which are connected in series with each other between conductors 19 and 69. Another resistor R9 connects the junction between resistor R8 and capacitor C8 to the junction between photocell PC1 and Neon lamp N. The other input terminal 72 of diode bridge 60 is connected by a conductor 20 to the other one of the telephone lines 6.

The coupling circuit 18 is more completely described in U.S. Pat. No. 3,523,187, Victor E. Stewart, Jr., issued Aug. 4, 1970.

The normal telephone central office battery voltage applied to the lines 2 and 3, which is in the order of 48 volts D. C., is insufficient to fire the neon lamp N, so that the coupling circuit 18 is normally inactive and conductors 19 and 69 are effectively opencircuited.

High dialing and ringing peak voltages, which may be in the order of 400 volts, are of insufficient duration to cause operation of the coupling circuit 18. However, when the remote transponder exciter 5, which is explained more fully hereinafter, is actuated, a voltage of approximately 250 volts is applied between the lines 2 and 3. As a result, sufficient charge will accumulate on capacitor C8 to break down the neon lamp N, causing the latter to illuminate the photocell PC1. This, in turn, causes the photocell PC1 to go from a high impedance state to a low impedance state, thereby cornecting the conductors 19 and 69. As long as the input voltage signal is greater than the lamp extinction voltage, lamp N will remain illuminated so that coupling circuit 18 will, in effect, remain latched in its conductive or active state.

Lamps 26 and 27 have a common terminal connection through a conductor 76 to conductor 20. In addition, the other terminal of lamp 26 is connected to the bridge output terminal 64 through a resistor R10. The other terminal of lamp 27 is connected to bridge output terminal 63 by an RC time delay circuit 77. The latter circuit includes resistors R11 and R12 and a capacitor C9 which are connected in series between diode bridge terminal 63 and conductor 76. In addition, resistor R14 and a photoresistor PC2 are connected to the other terminal of lamp 27 and to the junction between resistors R11 and R12 and between resistor R12 and capacitor C9, respectively.

When the photocells 50 through 53 are not illuminated, they are in a high impedance state so that the capacitors C1, C2, C3 and C4 are effectively disconnected and the oscillator 61 sees merely the capacitance of capacitor C5. When either of the lamps 26 and 27 is energized, only those photocells which are opposite the holes 29 will be illuminated and thereby go from a high impedance state to a low impedance state. Thus, those capacitors connected in series with an illuminated photocell will be effectively connected in parallel with capacitor C5 so that the oscillator 61 see a higher value of total capacitance. Preferably, capacitors C1, C2, C3 and C4 have different predetermined respective capacitances which are related so as to provide a different parallel capacitance with respect to the capacitor C5 for each position of the discs 21 and 22. For example, capacitors C1, C2, C3 and C4 may be 1nf, 2nf, 4nf and 8nf, respectively, as shown in FIG. 6 so as to provide the indicated parallel capacitance for each disc position.

As those skilled in the art will appreciate, the frequency (*f*) of the oscillator 61 will be given by the expression:

$$W \cong (1/2\pi \sqrt{LC})$$

where $$C\,[(1/C6) + (1/C5 + C_n)]^{-1}$$

and $C_n$ is the sum of those ones of the capacitances C1, C2, C3 and/or C4 that are connected in parallel with capacitance C5 as the result of their respective photocells 50, 51, 52 and/or 53 being illuminated through the holes 29 in the discs 21 or 22. As a result, the oscillator 61 will have a different output frequency for each position of the discs 21 and 22.

The aforementioned basic relationship of the digital value to be transmitted to the transmitter frequencies may then be related to circuit 1 the following equation:

$$(W_i - W_o / W_o) = f(n\, C_i / C_o) = f(n)$$

where $n$ = digital value $W_i$ = frequency of data signal $W_o$ = reference frequency $C_i$ = total capacitance of those capacitors $C_1$ through $C_5$ which are connected in parallel, and $C_o$ = reference capacitance, i.e. capacitance of capacitor $C_5$.

FIG. 7 illustrates the details of the remote transponder exciter 5 which is effective to produce in telephone lines 2 and 3 the interrogation voltage format illustrated in FIG. 8. Transponder exciter 5 includes a pair of similar voltage sources 80 and 81. The connection point between voltage sources 80 and 81 is grounded at point 82. Voltage source 80 produces a voltage in conductor 83 which is positive with respect to ground, and the voltage source 81 produces a voltage of similar magnitude in conductor 84 which is negative with respect to ground. A controlled rate of increase in the output voltage is obtained by charging capacitors 85 and 86 at a controlled current flow rate. To accomplish this controlled rate, constant current regulating circuits 87 and 88 are inserted in series with conductors 83 and 84, respectively. A controlled rate of decrease of the output signal voltage is accomplished by providing constant current regulating circuits 89 and 90 in series to be connected across capacitors 86 and 85 to discharge capacitors 85 and 86 at a controlled rate. The polarity of the output of transponder exciter circuit 5 at output terminals 81 and 82 may be reversed by operation of a conventional polarity reversing switch 93. Output terminals 91 and 92 connect to line 6, shown in FIG. 1. A two-pole double-throw switch 94, when in the position shown, causes charging of capacitors 85 and 86 and, when operated to its opposite position, causes discharge of capacitors 85 and 86 through current regulating circuits 89 and 90. Switches 93 and 94 may be operated by appropriate automatic controls such as an electronic time base programmer which may be incorporated in per channel control 13.

Constant current regulating circuit 87 includes a PNP transistor 95 having its emitter connected to conductor 83 and its collector connected to a conductor 96 through a resistor 105. A second PNP transistor 97 has its emitter connected to the base of transistor 95 and its collector connected to conductor 96. A voltage divider comprising a resistor 98 and a resistor 99 in series is connected between conductor 83 and ground point 82. A resistor 100 is connected between conductor 83 and the base of transistor 95. A current limiter 101 is connected between the juncture of resistors 98 and 99 and the base of transistor 97. A Zener diode 102 is connected between conductor 96 and a ground point 103. As will be understood by those skilled in the art, current limiter 101 provides a substantially constant current to the base of transistor 97 which, in turn, provides a substantially constant current to the base of PNP transistor 95 which, in turn, regulates the current flow between conductors 83 and 96. Regulating circuit 87 preferably utilizes the multi-stage configuration illustrated to provide sufficient current gain.

Similarly, current regulating circuit 88 is interposed between conductor 84 and a conductor 104. Regulating circuit 88 is similar to current regulating circuit 87 but utilizes NPN transistors rather than PNP transistors. The operation of the circuit is otherwise similar, as will be understood by those skilled in the art. Circuit 88 comprises a first transistor 106, a second transistor 107 and a current limiter 108, together with resistors 109, 110, 111 and 112. A Zener diode 113 is connected between conductor 104 and ground point 103.

The constant discharge current regulating circuit 89 is conventional and consists of an NPN transistor 114 and two voltage dividing resistors 116 and 117. Similarly, the other constant discharge current regulating circuit 90 consists of a PNP transistor 118 and resistors 120 and 121.

A return tone signal pickup transformer 125 is provided to pick up the coded tone signals which return from transponder circuit 16 through telephone lines 2 and 3. The primary winding of transformer 125 is connected between capacitors 85 and 86 with its center tap connected to ground point 103. A pair of bilateral voltage limiting devices 126 and 127 are connected respectively across the two halves of the primary of transformer 125. A relay 128 or other switching device having contacts **128*a* and 128*b* connected across the two halves of the primary of transformer 125 is operated to shunt the primary of transformer 125 during charging or discharging of capacitors 85 or 86 to eliminate D. C. current flow therethrough during such periods and to eliminate spiking due to transformer inductance in series with capacitors 85 and 86. Contacts 128*a* and 128*b* are open during those periods when tone signals are being transmitted. The secondary winding of transformer 125 is connected to output terminals 129 which, in turn, connect to lines 7 shown in FIG. 1**.

Figures 8A, 8B:
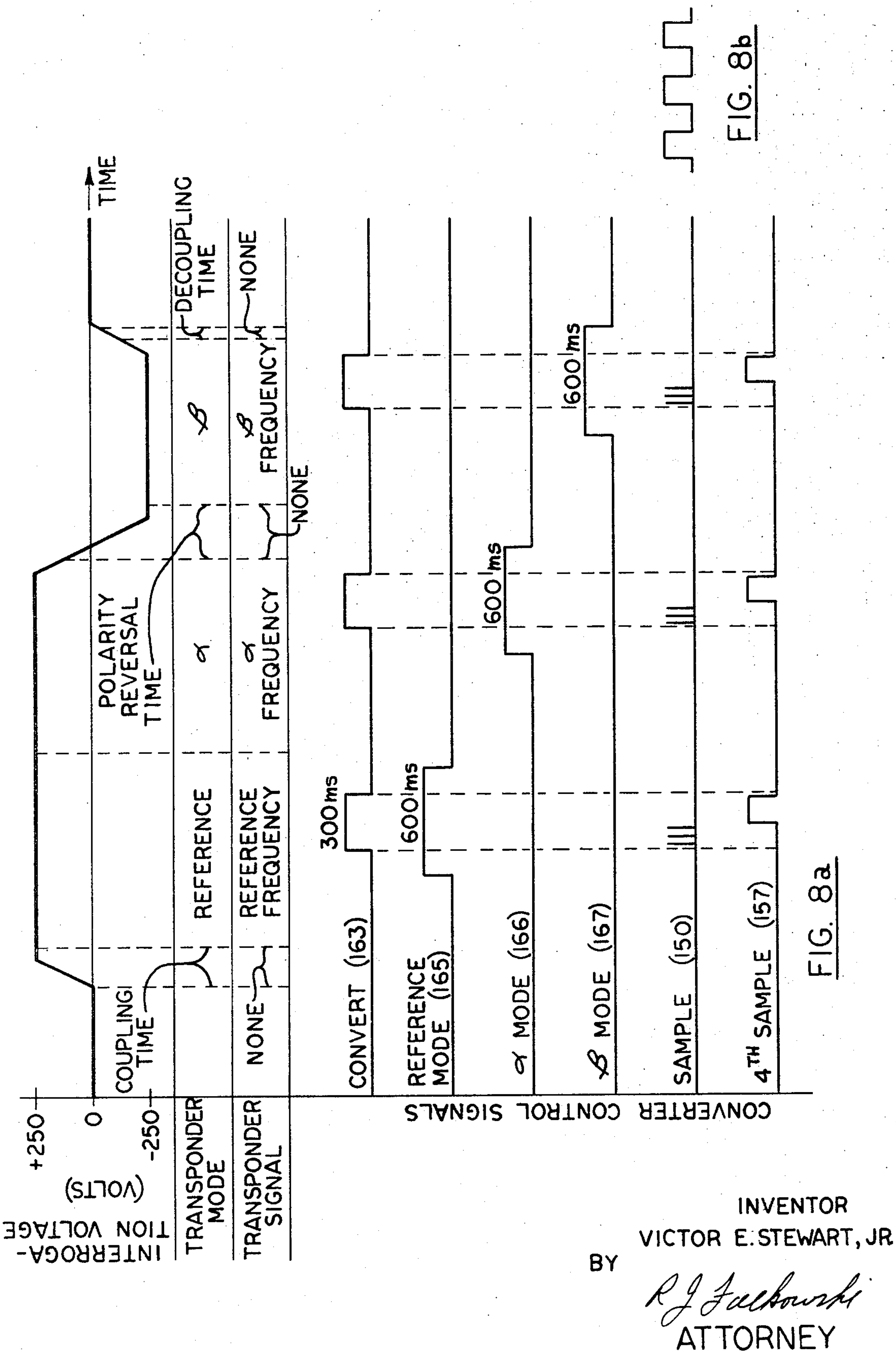
FIG. 8*a* is a graphical illustration of the signal format produced by the circuit of FIG. 7 and the resulting operation of the system.
FIG. 8*b* is an enlarged portion of FIG. 8*a;*

If it is assumed that output terminal 91 is connected to telephone line 2 and conductor 19 through line selector 4, the operation of switch 93 to its right hand position will result in a positive interrogation voltage on line 2 and conductor 19. Referring to the interrogation voltage diagram of FIG. **8*a*, the polarity of the interrogation voltage will be taken as positive when line 2 is positive with respect to line 3, and the magnitude of the interrogation voltage will be taken as the magnitude of the voltage existing between lines 2 and 3. With the switch 94 in the position opposite to that shown and with switch 93 in its open position, as illustrated, the interrogation voltage, as shown in FIG. 8*a*, will initially be zero. When switch 93 is operated to its right hand position and switch 94 is operated to the position shown, the interrogation voltage will begin to increase at a linear rate determined by the capacitance of capacitors 85 and 86 and the rate of current flow as regulated by circuits 87 and 88. As is well known to those skilled in the art, telephone bell ringing is effected by a series of rapid voltage changes in the telephone lines. The rate of increase of the present voltage signal is selected to be low enough so as not to cause ringing of the customer's telephone. The interrogation voltage increases to the maximum as determined by voltage sources 80 and 81**, which maximum is illustrated as + 250 volts. The time consumed by the change from zero to + 250 volts may preferably be 150 milliseconds, depending upon characteristics of the equipment serviced by the telephone central office. The maximum voltage will be held as long as switch 93 is in its right hand position and switch 94 is in the position illustrated. The time during which the interrogation voltage is held at +250 volts, as illustrated in FIG. 8*a*, may preferably be on the order of 2,100 milliseconds. When it is desired to reverse the polarity of the interrogation voltage, switch 94 is operated to its opposite position. This causes capacitors 85 and 86 to discharge through current regulating circuits 89 and 90. The interrogation voltage signal will then decrease at a rate which is again selected to be less than that required to cause ringing of the customer's telephone. When the interrogation voltage reaches zero, switches 94 and 93 are operated so that switch 93 is first operated to its left hand position and switch 94 is then returned to the position shown. The operation of switch 94 causes capacitors 85 and 86 to again be charged, while the operation of switch 93 causes the polarity of the output appearing at terminals 91 and 92 to be reversed. The interrogation voltage, therefore, continues below zero in a negative direction at a rate which is again less than that required to cause ringing of the customer's telephone. The time required for the change from positive 250 volts to negative 250 volts, as illustrated in FIG. 8*a*, may preferably be about 300 milliseconds. Negative 250 volts is held for a desired time which may preferably be about 900 milliseconds. The interrogation voltage is again returned to zero, again at a rate less than that required to cause ringing of the customer's telephone, by operation of switch 94 to the position opposite to that illustrated in FIG. 8*a*. Capacitors 85 and 86 thereupon discharge at a controlled rate through circuits 89 and 90. The time required for the interrogation signal to return to zero may preferably be about 150 milliseconds. The transponder exciter 5 may then be disconnected from the lines 6 by opening switch 93.

The operation of the transponder portion of the system will now be described.

Assume that a reading of the meter 17 is to be taken. The line selector 4 is actuated to select the desired customer's lines 2 and 3 and to make electrical connection thereto. The remote transmitter exciter 5 is actuated and places a positive interrogation voltage on line 2 with respect to line 3. This initiates the coupling time indicated in FIG. 8*a* in the horizontal line labelled "-transponder mode". Eventually, capacitor C8 will charge to a sufficiently high voltage to break down the neon lamp N in the coupling circuit 18. This illuminates the photocell PC1, which then changes from a high impedance state to a low impedance state, whereby current may continue to flow to lamp N. With the photocell PC1 in its low impedance state, the lamp N will remain illuminated as long as the interrogation voltage signal remains sufficiently high in the customer lines 2 and 3.

The diode bridge 60 performs a function of signal receiving and mode selection. More specifically, the bridge 60 receives the actuating signals from the remote transmitter exciter 5 and selects which of the lamps 26 and 27 will be energized so that the discs 21 and 22 may be selectively read.

When the coupling circuit 18 becomes active at the end of the coupling time, voltage appears across the diode bridge output terminals 63 and 64 which energizes the oscillator 61. In addition, this voltage, less the small drop across diode D2, appears across the lamp time delay circuit 77 which momentarily prevents lamp 27 from illuminating. The voltage across lamp 26 will be that across the diode D1 and this will be insufficient to cause the lamp to light. Initially, therefore, only capacitors C5 and C6 will be in the oscillator circuit 61 and, accordingly, a reference frequency signal ($W_o$) will be placed on the lines 2 and 3 and received at terminals 129. With reference to FIG. 8*a*, this period of operation is indicated as the reference transponder mode and may have a time duration of approximately half the time at which the interrogation voltage remains at positive 250 volts. After a time delay determined by the values of resistance and capacitance in the time delay circuit 77 and the lamp breakdown voltage of lamp 27, the neon lamp 27 will be illuminated, and predetermined ones of photocells 50, 51, 52 and 53 will be activated in accordance with the position of disc 22. This will modify the capacitance seen by oscillator 61 to a capacitance ($C_i$) representative of the value desired to be transmitted, and, accordingly, a second frequency signal ($W_i$) will be applied to lines 2 and 3 to indicate the position of the disc 22. This period of operation is indicated in FIG. 8*a* as the alpha transponder mode and the output signal frequency is called the alpha frequency.

It will be appreciated that the alpha frequency signal will be some increment below that of the reference frequency signal. By thus reading the disc 22 position as a predetermined variation or precentage of the reference frequency, rather than at a discrete frequency, variations in capacitive values as a result of aging, for example, will not prevent unambiguous readings.

After disc 22 has been read and the alpha frequency transmitted during the alpha transponder mode has been received, the remote transponder exciter 5 will reverse the polarity of the customer's lines 2 and 3 during the time indicated as the polarity reversal time transponder mode on FIG. 8*a*. Lamp 26 will thereupon be energized through conductors 20, 76, resistor R10, diode D3, conductor 69 and coupling circuit 18 when coupling circuit 18 again becomes conductive. The oscillator 61 is energized through diodes D3 and D2 while diode D2 prevents energization of lamp 27. This initiates the beta transponder mode, and the beta frequency is transmitted to indicate the position of disc 21. Here again, certain of the photocells 50, 51, 52 and 53 may be illuminated in accordance with the position of the disc 21 so that certain ones of the capacitors C1, C2, C3 and C4 may be connected in parallel with the capacitor C5. This will provide a tone signal at the beta frequency in accordance with the reading of disc 21 to the customer lines 2 and 3 and which is received at terminals 129.

Because the disc 22 makes 16 steps for each step of disc 21, a total of 256 steps of the meter 11 is possible for each encoder register cycle. If meter readings of a greater number of steps per cycle are desired, the discs 21 and 22 may be made with a greater number of code units 29 and 30, or one or more additional discs, lamps and sensor units may be provided.

It will also be appreciated that additional discs could also be read through conductors 66 and 67 by providing further selectively operable lamps and/or additional photocells or capacitive incrementing circuits having different capacitive values so that different tone signals could be produced. While in the preferred embodiment of the instant invention switching of the capacitors C1, C2, C3 and C4 is performed by photocells 50, 51, 52 and 53, it will be appreciated that this switching function could be performed by other devices as well. In addition, it is not necessary that a capacitive incrementing circuit be employed to modify the tone signal output of an oscillator, but an incrementing circuit which modifies other impedances, such as inductances or resistances, could also be employed to modify the output tone signal of an oscillator so that a tone signal could be provided to convey data in a plurality of information bits.

Referring to FIG. 1, as previously explained, the signals appearing at the output terminals 129 of transponder exciter 5 are carried by conductors 7 to the input of distortion equalizer 8. The signals are then conveyed from the output of distortion equalizer 8 to the input of automatic gain control 9. There is a wide variety of conventional automatic gain control circuits which may be used at this point of which the circuit shown in FIG. 9 is an example.

Referring to FIG. 9, the coded signal train is delivered to an input conductor 130 of the automatic gain control 9 shown in FIG. 9. A resistor R16 connects the input conductor 130 to the input of an amplifier 131. The input of amplifier 131 is also connected through a photocell PC3 to ground. Photocell PC3 has a resistance characteristic such that the resistance of photocell PC3 decreases as photocell PC3 is increasingly illuminated by an associated incandescent lamp 132. The output of amplifier 131 appears in output conductor 133. The level of the output appearing in conductor 133 is detected by a detection circuit 134 comprising in series, a resistor R17, a diode D7 and a resistor R18 connected from conductor 133 to ground. A capacitor C10 is connected across resistor R8 to provide an integrating or averaging function. The junction between diode D7 and resistor R18 is connected to the input of an amplifier 135. The other input terminal of amplifier 135 is connected to ground. The output of amplifier 135 is used to power the incandescent lamp 132. As those skilled in the art will appreciate, as the level in output conductor 133 rises the input to amplifier 135 increases. Consequently, the output of amplifier 135 increases to increase the illuminating output of lamp 132. As photocell PC3 is more strongly illuminated, its resistance decreases. Consequently, the amplitude of the input signals to amplifier 131 at the junction of resistor R16 and photocell PC3 is reduced. The output signals delivered by amplifier 131 to output conductor 133 are thereby restored to the desired level.

Figure 10A:
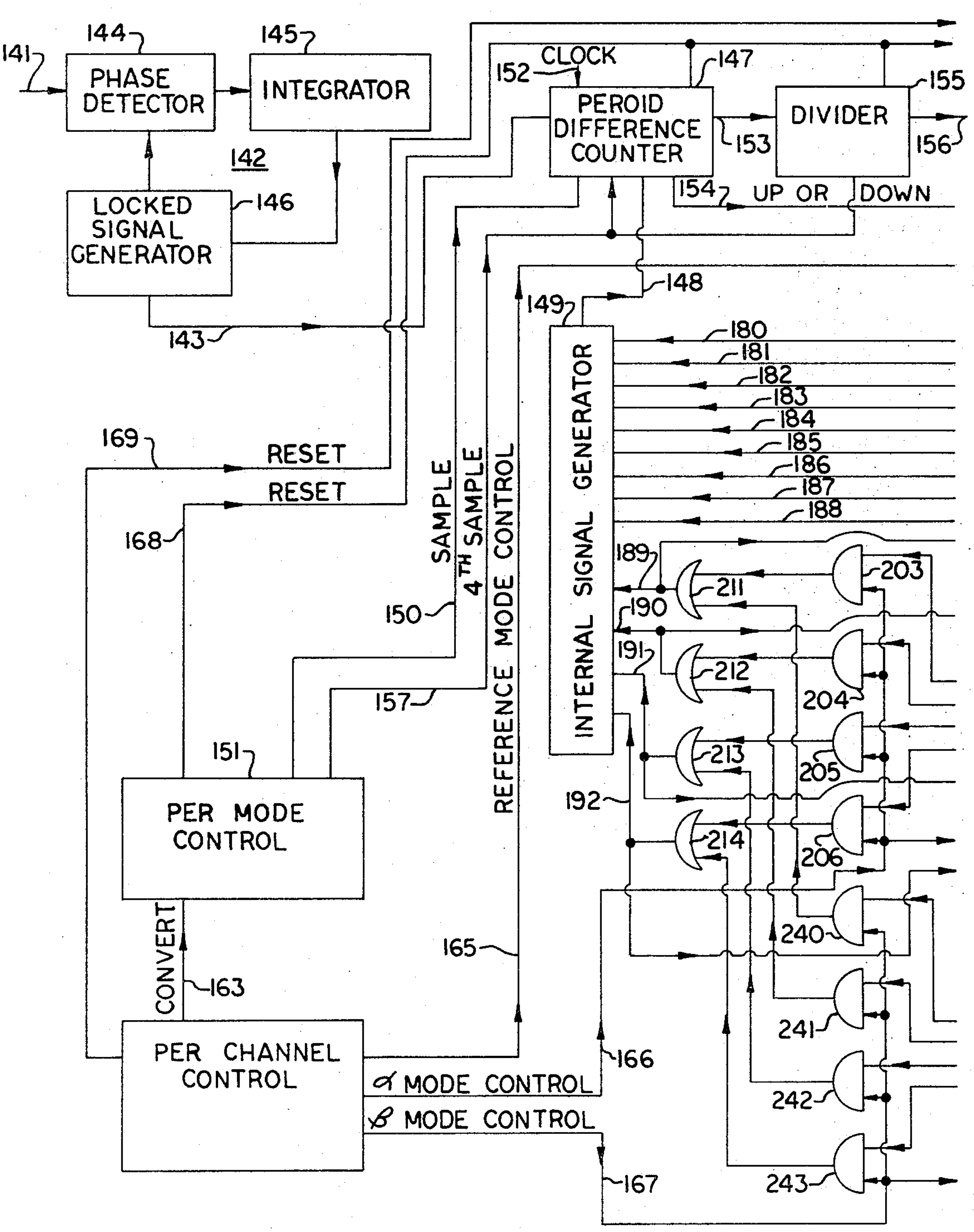
FIGS. 10*a* and 10*b*, when placed side-to-side, form a diagrammatic showing of one of the frequency-to-digital converters shown in the system of FIG. 1.

The output 140 of automatic gain control 9 leads to each of the band pass filters 10A through 10L. The signals passing through band pass filters 10A through 10L are led to corresponding frequency to digital converters 11A through 11L. Each of converters 11A through 11L consists of a system such as illustrated in FIG. 10A.

The tone signal received from the corresponding one of filters 10A through 10L is received at input 141 to a conventional phase lock loop 142. It is the function of phase lock loop 142 to convert the substantially sinusoidal frequency signal at input 141 to a signal of the same frequency at the output 143 of phase locked loop 142. The phase locked loop 142 consists of a phase detector 144, an integrator 145 and a locked signal generator 146. Phase detector 144 functions to compare the phase relationship between the signal at input 141 with the signal produced by locked signal generator 146. In response to the output of phase detector 144, the integrator 145 sends a signal to locked signal generator to control the frequency thereof and to "lock" the phase of the output of locked signal generator 146 to the phase of the signal at input 141. This obviously results in locking the frequency of generator 146 to that of input 141. This phase locking process takes time and is facilitated by the provision of ample time by the extended band approach of the present invention.

The output 143 of locked signal generator 146 goes to a period difference counter 147. It is the function of period difference counter 147 to compare the period of the signals from the output 143 of lock signal generator 146 with the output 148 of an internal signal generator 149. This comparison is made upon a sample command appearing as one of the outputs 150 of a per mode control 151. A clock input 152, preferably having a frequency of 1 megahertz, provides a train of timed pulses which are counted during the desired periods to give a digital indication of the time difference between the periods of the external signal 143 and the internal signal 148. Period difference counter 147 has two outputs, 153 and 154. Output 153 is a quantitative output representative of the absolute difference between the period of the output 143 of the locked signal generator 146 and the period of the output 148 from the internal signal generator 149. Output 154 is an up or down signal which indicates whether the output 148 of internal signal generator is greater or less in period than the output 143 from locked signal generator 146. If the period of the signal from internal signal generator 149 is less than the period of the signal in the output 143 of lock signal generator 146, an "up" signal is produced and, conversely, if the period of the signal from internal signal generator 149 is longer, a "down" signal is produced. The signal appearing in output 154, therefore, indicates whether the period of the signal from internal signal generator 149 must be increased or decreased in order to correspond in frequency to that of the signal appearing at input 141.

Figures 12, 13:
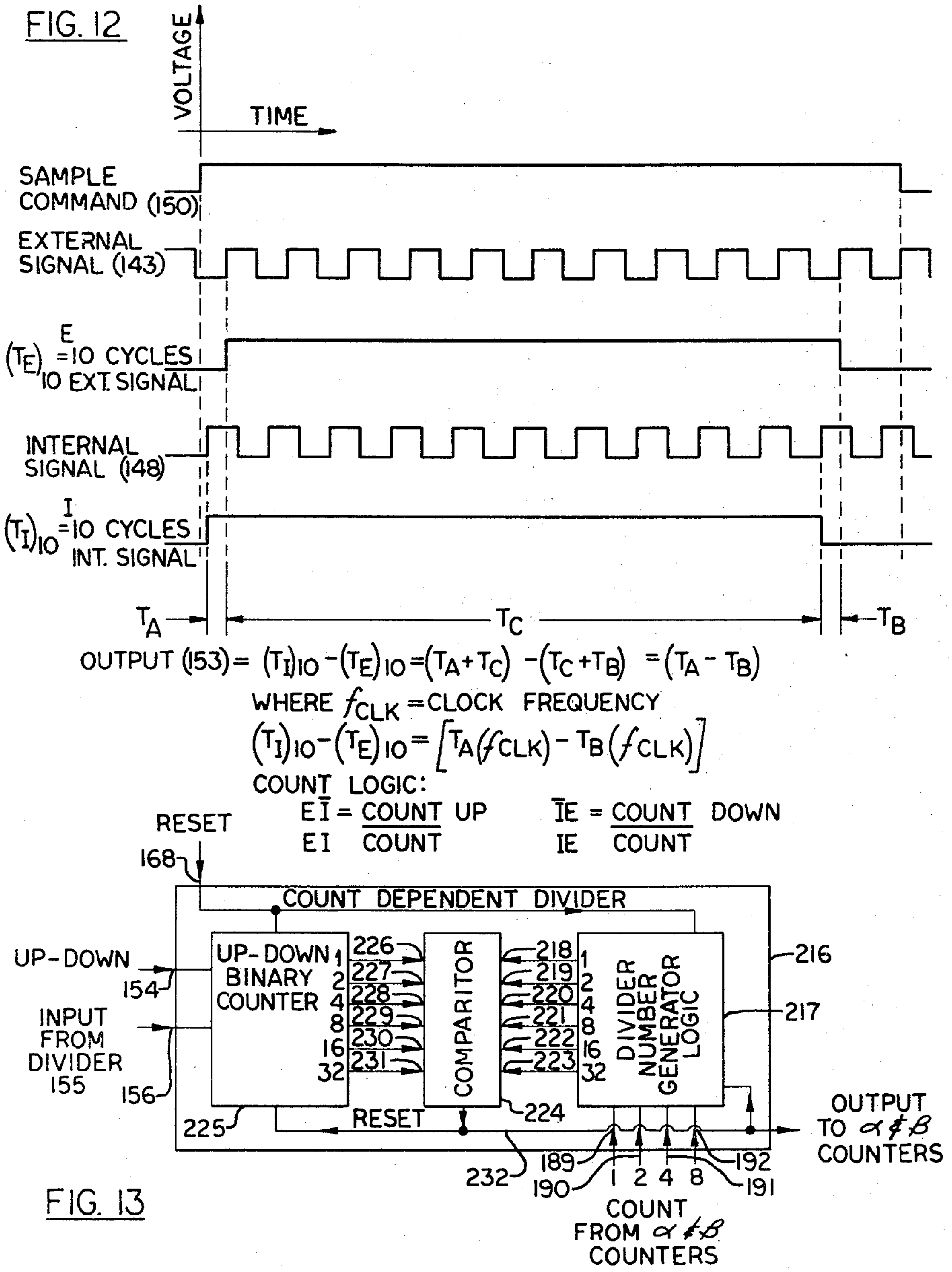
FIG. 12 is a diagram illustrating the operation of the period difference counter.
FIG. 13 is a diagram illustrating the count dependent divider.

FIG. 12 illustrates the operation of period difference counter 147. The logic and counting functions illustrated therein may be accomplished by using various logical techniques and devices well known to those skilled in the art, and the details of construction of such devices form no part of the present invention and are therefore not herein described. As shown in FIG. 12, period difference counter 147 responds to a high sample command 150 which is of sufficient duration to permit period difference counter 147 to complete its comparison, which duration is preferably illustrated to be about twelve cycles of the external signal 143. After the sample command 150 goes high, the period difference counter counts the next ten cycles of the external signal 143 and forms a signal E which is a signal preferably having a duration of ten cycles of the external signal 143. Similarly, the period difference counter forms a signal I which has a duration of 10 cycles of the internal signal 148. The period between the initiation of signal I and the initiation of signal E is designated as $T_A$, and the period between the cessation of signal I and the cessation of signal E is designated as $T_B$. The period between period $T_A$ and period $T_B$ is designated as period $T_C$. The equation appearing immediately below the signal diagram illustrates the nature of the output signal appearing at output 153 of period difference counter 147. Where $T_I$ is the period of the internal signal frequency and $T_E$ is the period of the external signal cycle, $(T_I)_{10}$ is the period of signal I, and $(T_E)_{10}$ is the period of signal E, as the equation illustrates, the output 153 comprises a series of clock pulses equal to the difference between the number of clock pulses occurring during period $T_A$ and the number of clock pulses appearing during period $T_B$. As the tabulated count logic illustrates, this output is obtained by algebraic summation of the counts obtained by counting up when there appears E but not I, in counting down when there appears I but not E, and by not counting when there appears E and I, or not E and not I.

Since the output 153 represents the difference in periods of ten cycles, the number of pulses in output 153 is divided by the number of cycles taken in the sample in period difference counter 147, which number of cycles was preferably 10 cycles. A divider 155 is therefore provided to divide signal 153 by 10 to produce an output 156 such that one pulse equals one unit of period difference. As will be more fully explained hereinafter, a fourth sample command signal 157 is provided from per mode control 151 to increase the period of the sample taken in period difference counter 147 for the fourth successive sample taken during each frequency determination. This fourth sample command 157 leads to both the period difference counter to increase the number of cycles of the sample preferably from 10 to 100 and to divider 155 to increase the divisor by a factor of 10. During such fourth sample, the signal 156 therefore remains normalized such that one pulse equals one unit of period difference.

The signal 156 is used to operate either a reference integrating counter 160, an alpha integrating counter 161 or a beta integrating counter 162, depending on whether the system is operating in the reference mode, the alpha mode or the beta mode, respectively, as controlled by the perchannel control 13. Per channel control 13 provides a convert command signal 163 to permode control 151 to initiate the sampling process which will more fully hereinafter be explained with reference to FIG. 8*a*. Per channel control 13 also has a reference mode control signal 165, an alpha mode control 166 and a beta mode control signal 167 which occur in sequence to control whether the system operates in the reference mode, the alpha mode or the beta mode, as shown in FIG. 8*a*. A permode reset signal 168 from per mode control 150 provides a reset pulse to period difference counter 147, divider 155 and divider 216 before each sample command signal. A per channel reset signal 169 from per channel control 13 provides a reset pulse to counters 160, 161 and 162 before the reading of any given channel is initiated.

The reference integrating counter 160, the alpha integrating counter 161 and the beta integrating counter 162 each in turn serve to adjust the frequency of the output signal 148 of the internal signal generator 149. Therefore, before proceeding with the further description of the system, the detailed operation of the internal signal generator 149 will be described.

Figure 11:
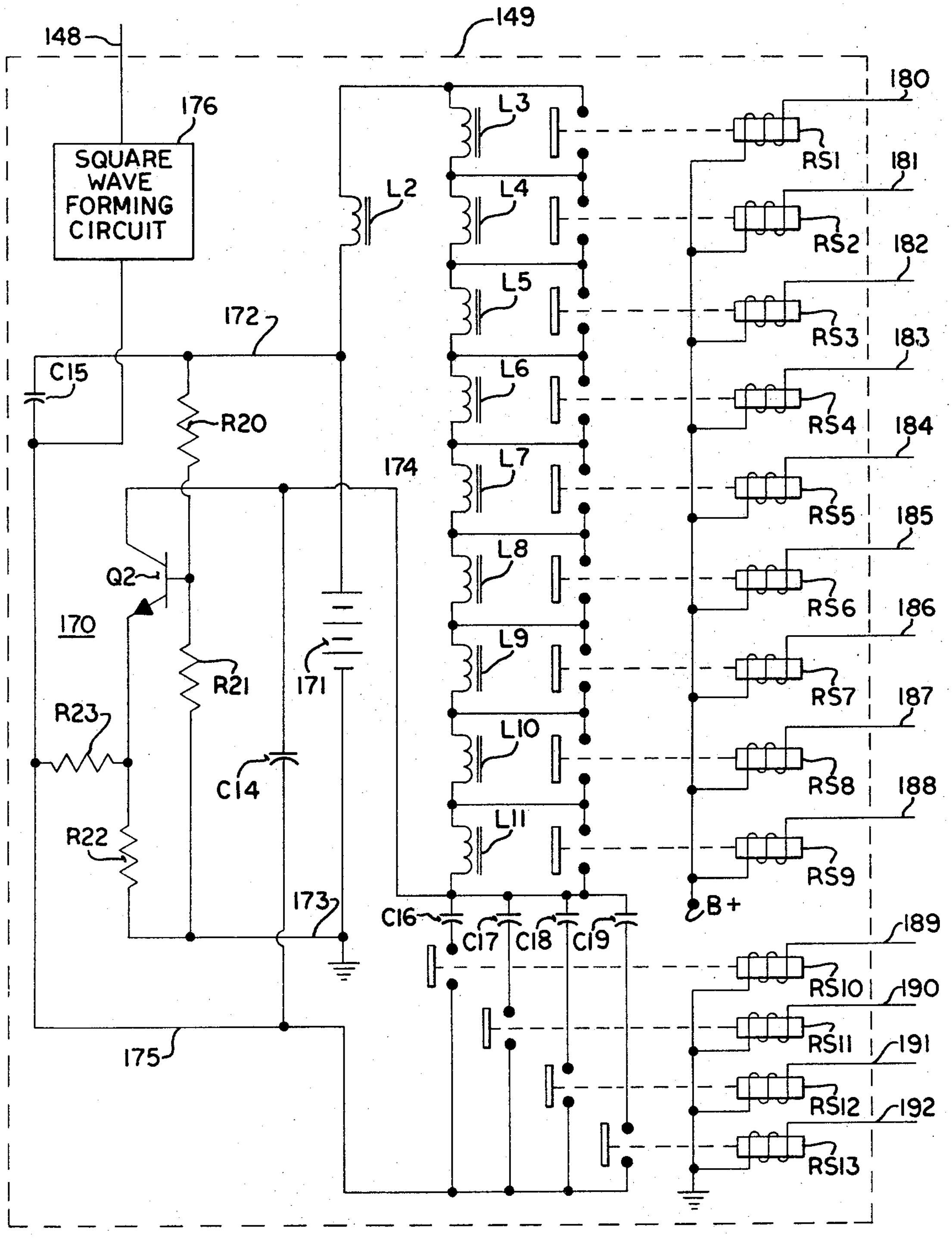
FIG. 11 is a schematic diagram of the internal signal generator shown in FIG. 10*a;*

Referring to FIG. 11, internal signal generator includes an oscillator 170 which has a circuit basically similar to oscillator 61 in the transponder 16 shown in FIG. 2. A voltage source 171 applies a positive voltage to a conductor 172 and the negative side of source 171 is connected to a grounded conductor 173. A pair of resistors R20 and R21 are connected in series between conductor 172 and 173, and their juncture is connected to the base of a transistor Q2. The collector of transistor Q2 is connected to a conductor 174. The emitter of transistor Q2 connects through a resistor R22 to conductor 173. A capacitor C14 is connected between conductor 174 and a conductor 175. A resistor R23 connects conductor 175 to the emitter of transistor Q2. A capacitor C15 is connected between conductor 175 and conductor 172. The frequency signal which appears at conductor 175 is connected to a square wave forming circuit 176 which is of conventional construction and takes the substantially sinusoidal frequency signal at conductor 175 and delivers a squared output signal 148 of the same frequency. An inductor L2 is connected in series with a series group of incrementing inductors L3 through L11. Inductors L2 through L11 are connected between conductor 172 and conductor 174. Four incrementing capacitors C16 through C19 are arranged in parallel fashion between conductor 174 and conductor 175 and may be connected in parallel with capacitor C14.

As will be appreciated by those skilled in the art, the frequency of the output 148 of internal signal generator 149 will vary inversely as the square root of the product of the circuit inductance and capacitance where the circuit inductance equals the sum of the inductances of those of inductors L2 through L11 which are not shunted, and the circuit capacitance equals the sum of the capacitances of capacitors C14, C16, C17, C18 and C19 which are connected in circuit. The frequency of the output 148 of internal signal generator therefore may be varied by selective energization or de-energization of relays RS1 through RS13. Relay RS1 through relay RS13 may preferably be of the biased reed switch type. The contacts of RS1 through RS9 serve to selectively shunt out inductors L3 through L11, respectively. Relays RS10 through RS13 have contacts which selectively connect into the circuit capacitors C16 through C19, respectively. Relays RS1 through RS13 are operated by selectively applying or removing signals to inputs 180 through 192, respectively, which connect to the respective coils of relays RS1 through RS13. The other sides of the operating coils of relays RS10 through RS13 are connected to ground. The other side of the operating coils of relays RS1 through RS13 are connected to the B+ voltage source.

The inductances L3 through L11 have inductance values which are arranged in a binary coded fashion. If the inductance of L3 is taken to be one inductive unit, then the inductance of inductor L4 is two inductive units, that of inductor L5 is four inductive units, the inductance of inductor L6 is eight inductive units, et cetera, until the last inductor in the series, inductor L18, has an inductance value of 256 relative inductive units. The inductance unit value of inductor L3 may be such that it takes a change of one such unit of inductance to change the period of the output 148 of internal signal generator 149 a time corresponding to one pulse of the signal 156 from divider 155.

The capacitive values of capacitors C16 through C19 are also arranged to have a binary coded relationship such that, if the capacitance of capacitor C16 is taken to be one relative capacitive unit, then the capacitance of capacitor C17 is two capacitive units, the capacitance of capacitor C18 is four capacitive units and the capacitance of capacitor C19 is eight relative capacitive units. The absolute capacitive value of each such relative capacitive unit is selected to cause a change in frequency of the output 148 of internal signal generator 149 by a precise amount substantially equal to the ideal change in frequency of transponder 16 caused by switching in or out the corresponding one or ones of capacitors C1 through C4 in the oscillator 61.

It should be apparent at this time that, after the frequency of the internal signal generator 149, during the reference mode, is made substantially equal to that of the reference frequency emanating from transponder 16, capacitors C16 through C19 may be selectively connected during the alpha and beta modes in circuit to provide the closest available approximation of the frequency of the output 148 to the frequency of the alpha or beta signal emanating from transponder 16. A binary value may then be obtained during the operation of relays RS10 through RS13 to match the binary position code defined by which of capacitors C1 through C4 are either connected or disconnected from the oscillator circuit 61 in the transponder 16. Thus, it is possible to determine the positions of discs 21 and 22.

Figure 10B:
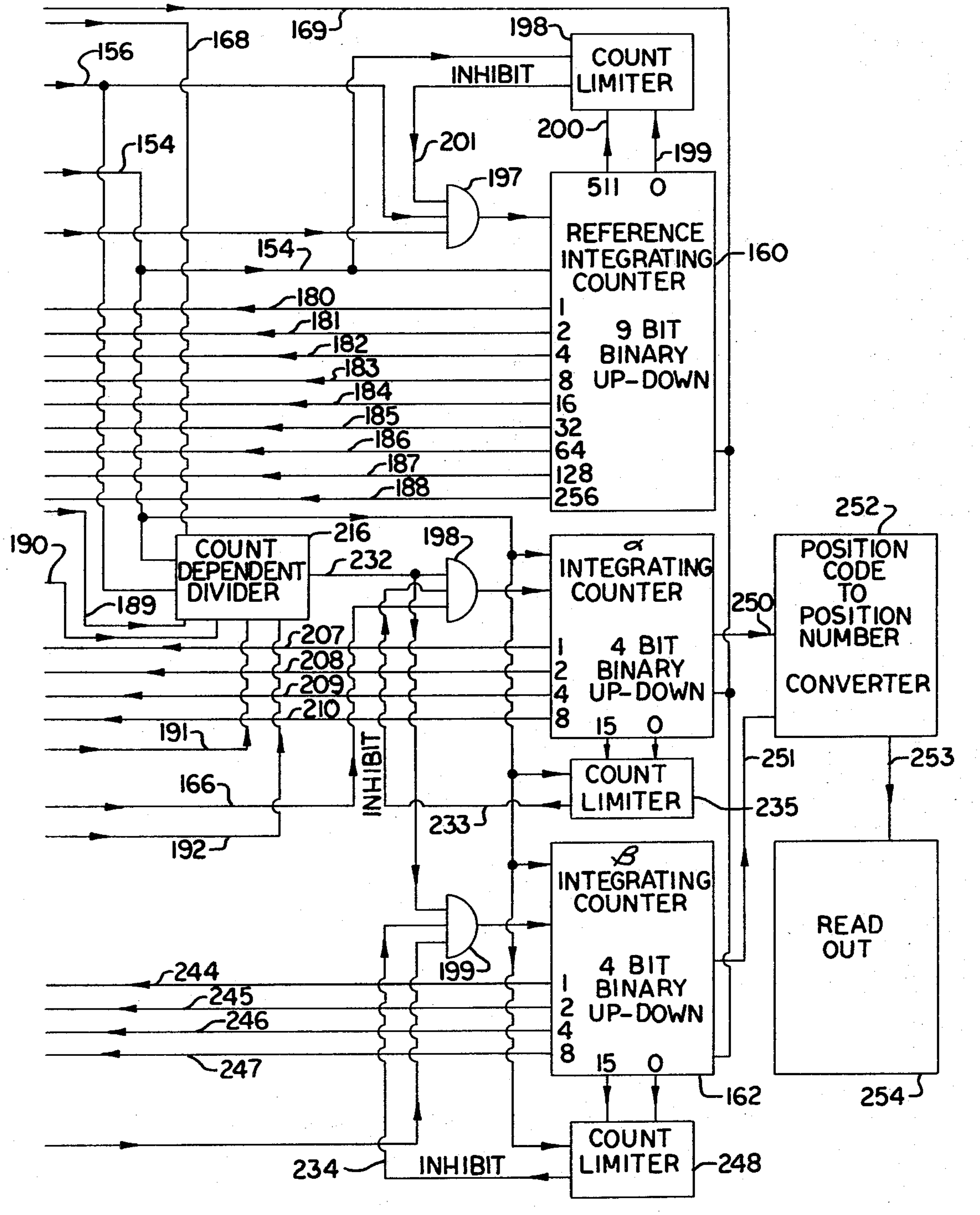

The operation of a typical one of digital converters 11A through 11L, as shown in FIGS. 10*a* and 10*b*, during the reference mode will now be considered.

The output 156 of constant divider 155 is one of the inputs to an "and" gate 197.

During the reference mode the per channel control 13 applies a reference mode control signal to its output 165 to another input of "and" gate 197 to enable the pulse train 156 to pass therethrough. During the reference mode, the per channel control removes the alpha mode control signal 166 and the beta mode control signal 167 from the inputs to "and" gates 198 and 199 to inhibit the operation of alpha integrating counter 161 and beta integrating counter 162, respectively.

A count limiter 198 is provided in conjunction with reference integrating counter 160 to limit the operation of reference integrating counter 160 within its limited register capacity and thus permit nulling of the difference between the external frequency signal 143 and the internal frequency signal 148 under all valid input conditions. The up or down signal 154 is connected to count limiter 198. Count limiter 198 also has a zero count input 199 from reference integrating counter 160 and a 511 count signal 200. When the count limiter 199 has a zero count signal from input 199 and a down count sense signal from its input 154 and inhibit signal 201 is applied to a third input of "and" gate 197 to prevent reference integrating counter 160 from counting below zero or, in other words, to prevent reference integrating counter 160 from turning over to the high end of its register capacity. Similarly, when count limiter 198 has a 511 count input from its input 200 together with an up count sense signal from its input 154, the same inhibit signal 201 is applied to the input of "and" gate 197 to prevent reference integrating counter from turning over to the low end of its register capacity. Between these two extremes the inhibit signal 201 is removed, and reference integrating counter is permitted to count freely up or down.

Reference integrating counter 160 is a nine-bit binary up-down counter, the nine outputs 180 through 188 having count values of 1 through 256, as indicated. The nature of the output signals 180 through 188 is such that relays RS1 through RS9 are energized when no count is present. In other words, when reference integrating counter 160 has a zero count, inductors L3 through L11 are all shunted out of the oscillator circuit by the respective contacts of relays RS1 through RS9. The appearance of a count signal in counter outputs 180 through 188 is represented by the removal of energizing current to the corresponding coil of the respective one of relays RS1 through RS9. This effects the insertion of the corresponding one of inductors L3 through L11 into the oscillator circuit 170. The energizing currents are applied when the counter outputs 180 through 188 go to ground voltage and removed when these outputs 180 through 188 go to B+ voltage.

FIG. 8*a* illustrates the sequence of events during the frequency measuring periods. During the reference transponder mode, the reference mode signal 165 is first applied to enable the operation of the reference integrating counter 160. The reference mode signal 165 may preferably remain high for 600 milliseconds, as illustrated in FIG. 8*a*. Subsequently to the initiation of the reference mode signal 165, the per channel control 13 initiates the convert command 163 which may have a duration of 300 milliseconds. The convert command 163 initiates the operation of the per mode control 151. The per mode control 151 produces three successive sample commands 150. FIG. 8*b* shows the sample command curve expanded horizontally to show the nature of the three sample command signals. Each of these three sample command signals, shown in FIG. 8*b*, is represented by the sample command curve shown in FIG. 12. The comparison process in period difference counter 147, as illustrated in FIG. 12, is effected during each of the three sample command signals illustrated in FIGS. 8*a* and 8*b*. A process of successive approximations to correct the frequency of internal signal generator output 148 is thereby effected. With each successive approximate correction, the frequency of internal signal generator output 148 is more closely adjusted to that of the external signal frequency 143. After the three 10-cycle sample periods, a fourth sample command signal 157 is produced by the per mode control 151 to cause a fourth sample to be taken by period difference duration 147 which is of a duration preferably ten times the duration of each of the previous three samples. By the time the third sample is taken, the frequency of the internal signal generator 149 is very close to that of the external signal 143 and a longer sample becomes necessary to accurately measure the remaining difference. The phase jitter may inhibit a sufficient null during the short samples, but the jitter becomes a negligible percentage of the longer sampling interval. Prior to the longer interval, other factors may limit the attained null. If the error of each of the approximations is conservatively stated to be plus or minus 2 percent of the required correction, it can be seen that the internal frequency 148 will be very close to that of the frequency of the external signal 143 following the fourth sample. In actual practice the frequencies are matched to within plus or minus 0.01 percent.

The sample lengths need not be constrained to those illustrated. The sample length may be chosen as desired and a corresponding divider number may be used to normalize the counts obtained.

As shown in FIG. 8*a*, after the fourth sample is taken the convert command 163 ceases. Following the cessation of the convert command 163, the reference mode control signal 165 ceases. The reference transponder mode period then ends, and the transponder mode changes to the alpha mode. During the alpha transponder mode the alpha mode control signal 166 is applied and is of a form similar to that of the reference mode command signal 165 and has a duration of about 600 milliseconds.

The alpha mode control signal 166 is applied to one of the inputs of "and" gate 198 to enable count signals to pass therethrough and thereby enable alpha integrating counter 161 to function. Alpha mode control signal 166 is also applied to one of the inputs of each of "and" gates 203, 204, 205 and 206 to enable the four-bit binary coded outputs 207 through 210 from alpha integrating counter 161 to pass through "and" gates 203 through 206, respectively, and thence to the inputs 189, 190, 191 and 192 of internal signal generator 149 through "or" gates 211, 212, 213 and 214, respectively.

The period difference count signal 156 is processed through a count dependent nonlinear divider 216. The up or down count sense signal 154 is also applied to the count dependent divider 216.

The count dependent divider 216 is required during operation in the alpha and beta modes because it is the nature of the circuitry that the relationship between the number of period difference counts in signal 156 and the number of relative capacitive unit changes in internal signal generator 149 is to some extent nonlinear. The count dependent nonlinear divider 216 is therefore provided to increase the accuracy of each of the successive approximations during the four sampling periods.

FIG. 13 illustrates the operation of count dependent divider 216. The count total from the alpha and beta counters is taken from the binary coded count signals 189 through 192 and fed into a divider number generator 217. Divider number generator 217, in response to the count indicated by signals 189 through 192, generates a divisor by which the count signal 156 is to be divided.

Divider number generator logic 217 includes a gated flip-flop set by the first output pulse to alpha and beta counters through output 232 for each sample's pulse train. This gated flip-flop's state selects one of two groups of divisors. Prior to the first pulse through output 232, a smaller number is generated which is equal to preferably about one-half the number which is utilized for the remaining output pulses for that train. After the first pulse through output 232, the divisor is determined exclusively by the alpha or beta counter contents and is referred to as the count dependent divisor. The above described procedure permits the decision threshold for changing capacitance to lie midway between the nominal difference values which would represent an ideal capacitance change.

The count dependent divisor preferably decreases in steps as the count total from the alpha or beta counter in signals 189 through 192 increases. The divisor number thereby generated is indicated to a comparator 224 by divisor number bits 218 through 223. The period difference count 156 is fed into an up-down binary counter 225 which counts up or down in response to up or down signal 154. The total produced by counter 225 is indicated to comparator 224 by count bits 226 through 231. When the count total reaches the divisor number, comparator 224 produces an output 232 which is sent to the alpha and beta counters and also serves to reset the counter 225. Counter 225 will again count to the indicated divisor number and again be reset. This process proceeds with the divisor number changing as desired as the count total changes. The count dependent divider thereby functions as a nonlinear divider of the period difference count 156.

It is then apparent that the count total in alpha integrating counter 161 corresponds to the coded count appearing in signals 189 through 191 to internal signal generator 149 and, therefore, gives a corresponding approximate indication of the position of disc 22. Alpha integrating counter 161 therefore contains information indicative of the reading of meter 17.

As shown in FIG. 8*a*, while the alpha mode signal 166 is applied, the perchannel control 13 applies the convert command 163 to initiate the operation of per mode control 151. The per mode control 151 thereupon produces the sample command signal 150. The first three sample periods ensue. Each of these sample periods represents a sample operation, as illustrated in FIG. 12, which was previously explained. FIG. 8*a* also shows that the first three short sample periods are followed by a longer fourth sample period. Thus, the sampling periods are similar to those which were previously explained in connection with the reference mode sampling.

As during the reference mode, the frequency of the internal signal generator 149 is adjusted by successive approximations in response to the counts received from alpha integrating counter 161. The frequency of internal signal generator 149 is adjusted by the switching in or out of the circuit capacitors C16 through C19 in response to the signals appearing at the inputs 189 through 192, respectively.

The alpha integrating counter is equipped with a count limiter 235 which is similar in function to the count limiter 198 used in connection with reference integrating counter 160. When count limiter 235 has a zero input from alpha integrating counter 161 and a down count signal from the count sense signal 154, an inhibit signal 233 is supplied to a third input of "and" circuit 198 to prevent alpha integrating counter 161 from counting below zero and thereby turn over to the high end of its limited register capacity. Conversely, when count limiter 235 has a fifteen-input together with an up count sense signal, an inhibit signal is similarly applied to "and" circuit 198 to prevent alpha integrating counter 161 from turning over to the low end of its limited register capacity. Between these two limits, alpha integrating counter 161 is uninhibited by count limiter 235.

As shown in FIG. 8*a*, during the alpha transponder mode the convert command 163 is removed following the completion of the fourth sample signal 157. The alpha mode command 166 ceases following the cessation of the convert command 163.

The operation of the frequency to digital converters 11A through 11L during the beta mode is very similar to that which occurred during the alpha mode. As shown in FIG. 8*a*, a beta mode signal 167 is applied by perchannel control 13 to an input of "and" circuit 199 to enable beta integrating counter 162 to function. Beta mode control signal 161 is also applied to one of the inputs of each of "and" circuits 240 through 242 to enable count signals to pass therethrough to the inputs 189 through 192, respectively, of internal signal generator 149. As was the case during the alpha mode, a convert command 163 follows to the per mode control 151 to initiate the four sample periods. The operation of beta integrating counter is similar to that of alpha integrating counter 161 and has a count limiter 248 which corresponds identically to count limiter 235 to provide, when appropriate, an inhibit signal 234 to "and" gate 199. Beta integrating counter 162 receives the pulse count signal 232 and counts up or down in response to signal 154 to produce binary coded output signals 244 through 247 to "and" gates 240 through 243, respectively. These signals thence pass through "or" gates 211 through 214, respectively, to the inputs 189 through 192 of internal signal generator 149. The resultant adjustment to the frequency output 148 of internal signal generator 149 is similar to that which occurred during the alpha mode in response to the output of alpha integrating counter 161.

Beta integrating counter 162 therefore contains information indicative of the position of encoder disc 21 and, therefore, may provide useful information as to the reading of meter 17.

The binary coded information contained in alpha integrating counter 161 and beta integrating counter 162 is transferred through outputs 250 and 251, respectively, to a position code to position number converter 252. Such converters are conventional, and their construction and operation is well known to those skilled in the art. The output 253 of converter 252 is indicative of the position of encoder 15 and is fed to a suitable readout device 254 which may preferably be an automatic billing machine. Such billing machines are well known to those skilled in the art, and the detailed construction of such machines forms no part of the instant invention.

It can be seen that the reference integrating counter 160 performs a memory function in recording the information indicative of the external signal 141. Reference integrating counter 160 also serves to adjust the frequency of internal signal generator 149 to correspond to the frequency of the external signal 141. The alpha and beta integrating counters 161 and 162 then serve to measure the relative changes in external signal frequency which occur during the alpha and beta modes, respectively, in response to the readings of the positions of discs 22 and 21, respectively. These relative frequency measurements are then converted to numbers indicative of the position of encoder 15. At the readout means 254 the input from converter 252 indicative of the change of reading of encoder 15 is added to the previous meter reading to obtain the new reading of meter 17.

The counters in the present invention which perform memory functions give the system the capability to measure in relatively drift-free fashion, the frequency error signals. The deviation with time of the frequency of the internal signal generator 149 is dependent only upon its intrinsic, here short term, stability. This means that the stability of the internal signal generator 149 is not affected by the drift which characterizes analog memory means.

It should also be noted that the two functions of digital read-out and digital error memory are achieved by a single means comprising internal signal generator 149.

The internal signal generator 149 also serves as a direct digital to analog converter. This contributes to stability over the short term. The receiver resolving power is improved by digital and relatively drift-free memorization of the reference frequency.

While only a single embodiment of the invention has been described, it is not intended that the scope of the appended claims be limited to the single embodiment, since it is adaptable to modification without departing from the scope of the appended claims.

I claim:

1. A data conversion system comprising:

a means for producing an input signal having a reference level and data levels varying as a function of a value to be converted;

a generator means for generating a generator signal having a level approximating said input signal reference level and for controllably varying said generator signal level independently of said input signal in response to a control signal;

a reference comparator means for comparing said generator signal level with said input signal reference level to produce a comparator output indicative of the difference between said generator signal level and said reference level; and an integrating means responsive to said comparator output for producing said control signal for said generator means to worry said generator signal level to substantially match said input signal reference level.

2. A data conversion system as defined in claim 1 in which said levels are frequency levels.

3. A data conversion system as defined in claim 1 in which said reference comparator means comprises digital difference counter means.

4. A data conversion system comprising:

an input means for providing alternately a reference signal having a selected level and a data signal having a selected level with the difference in level between said reference signal and said data signal selected to be representative of a value to be converted;

a generator means for generating a generator signal having a level controllably variable independently of said data signal levels and said reference level;

a comparator means for alternately comparing said generator signal level with said reference signal level and said generator signal level with said data signal level to alternately produce a first comparator output indicative of the difference between said generator signal level and said reference signal level and a second comparator output indicative of the difference between said generator signal level and said data signal level; and a means responsive to said comparator outputs for providing control signals to said comparator means to alternately vary said generator signal level to substantially match said reference signal level and to vary said generator signal level to substantially match said data signal level, and for providing an output representative of the difference between said generator signal level when matched to said reference signal level and when matched to said data signal level to thereby represent said value to be converted.

5. A system as defined in claim 4 in which said levels are frequency levels.

6. A system as defined in claim 4 in which said comparator means comprises digital difference counter means.

7. A value conversion system comprising:

a means for producing an input signal having a reference frequency, and data frequencies differing from said reference frequency by amounts selected to be representative of a value to be converted;

a signal generator means for generating an internal signal having a frequency controllably variable independently of said input signal frequencies;

a comparator means for digitally counting the difference in cycles of said reference frequency and said internal signal frequency and for producing a comparator output indicative of said difference; and an integrating means responsive to said comparator output for controlling said signal generator means to change said internal signal frequency to substantially match said reference frequency.

8. A data conversion system comprising:

an input means for providing alternately a reference input signal having a frequency and a data input signal having a frequency differing from said reference signal frequency by an amount selected to represent a value to be converted;

a signal generator means for generating an internal signal having a frequency controllably variable independently of said data signal and reference signal frequencies;

a period difference counting comparator means for alternately comparing said internal signal frequency with said reference signal frequency and comparing said internal signal frequency with said data signal frequency to alternately provide a digital output indicative of the difference between said internal signal frequency and said reference signal frequency and a digital output indicative of the difference between said internal signal frequency and said data signal frequency; and an integrating means responsive to said comparator outputs for controlling said signal generator to alternately vary said internal signal frequency to substantially match said reference signal frequency and to vary said internal signal frequency to substantially match said data signal frequency, and for producing a digital output representative of the change of said internal signal frequency between its value when matched to said reference signal frequency and its value when matched to said data signal frequency to thereby represent said value to be converted.

* * * * *